United States Patent [19]
Böttle et al.

[11] Patent Number: 5,303,077
[45] Date of Patent: Apr. 12, 1994

[54] OPTICAL SWITCH AND SWITCHING MODULE THEREFOR

[75] Inventors: Dietrich Böttle, Salach; Gert Eilenberger, Kirchheim, both of Fed. Rep. of Germany

[73] Assignee: Standard Elektrik Lorenz A.G., Stuttgart, Fed. Rep. of Germany

[21] Appl. No.: 851,754

[22] Filed: Mar. 13, 1992

[30] Foreign Application Priority Data

Mar. 14, 1991 [DE] Fed. Rep. of Germany ....... 4108213

[51] Int. Cl.[5] .................. H04J 4/00; H04J 14/00; G02B 6/26; G02B 6/42
[52] U.S. Cl. .................. 359/123; 359/117; 359/128; 359/139; 370/59; 370/64; 385/17
[58] Field of Search ......... 370/59, 63, 64, 66, 370/68; 359/109, 117, 123, 128, 139; 385/16–17, 24

[56] References Cited

U.S. PATENT DOCUMENTS

| | | | |
|---|---|---|---|
| 4,701,907 | 10/1987 | Collins | 359/117 |
| 4,922,487 | 5/1990 | Eilenberger et al. | 370/60 |
| 5,005,166 | 4/1991 | Suzuki et al. | 359/123 |
| 5,091,905 | 2/1992 | Amada | 370/63 |
| 5,194,977 | 3/1993 | Nishio | 359/123 |

FOREIGN PATENT DOCUMENTS

| | | |
|---|---|---|
| 3511072 | 10/1986 | Fed. Rep. of Germany . |
| 0013900 | 1/1989 | Japan .................. 359/123 |

OTHER PUBLICATIONS

Architectural Considerations for Photonic Switching Networks, H. Scott Hinton, IEEE Journal on Selected Areas In Communications, vol. 6, No. 7, Aug. 1988.
Tunable Optical-Wavelength Conversion Using an Optically Triggerable Multielectrode Distributed Feedback Laser Diode, Kawaguchi, et al., IEEE Journal of Quantum Electronics, vol. 24, No. 11, Nov. 1988.
Multidimensional Optical Switching Networks, D. W. Smith, et al, IEEE, British Telecom Research Labs.
Design of a Broadcast Packet Network, Jonathan S. Turner, Washington, St. Louis, Mo. 1986.
Optical Switching Device Technologies, Sakaguchi, et al., IEEE Communications Magazine, vol. 25, No. 5, May 1987.

*Primary Examiner*—Herbert Goldstein
*Assistant Examiner*—K. Negash
*Attorney, Agent, or Firm*—Ware, Fressola, Van Der Sluys & Adolphson

[57] ABSTRACT

A switching device for being connected to switch optical input signals received on a plurality of optical input signal lines into optical output signals on a plurality of optical output signal lines; each device has a time slot interchanger or a wavelength converter in combination with a space-division switching stage for freely exchanging signals on different lines, wherein, according to the invention, such a switching device has multiple stages, including both a time slot interchanger stage and a wavelength converter stage in combination with two space-division switching stages and wherein between every two of the space-division switching stages a time slot interchanging or wavelength converting stage is inserted; the time slot interchanger stages may alternate with wavelength converter stages with a space-division switching network stage in between.; the stages may be combined, such as space-division switching stages and time-slot-interchanging or wavelength-converting stages forming a single functional unit. The apparatus may comprise a module for use in a system having a plurality of such modules.

12 Claims, 5 Drawing Sheets

OPTICAL SWITCH AND SWITCHING MODULE THEREFOR

TECHNICAL FIELD

The present invention relates to an optical switch and, more particularly to a switching module therefor.

BACKGROUND OF THE INVENTION

One of the problems encountered in optical switching is the buffering of signals. To switch time-division-multiplexed signals, it is almost always necessary to interchange the time slots and, hence, to buffer the signals. In packet switches, which are currently of particular interest with regard to future ATM systems (ATM = asynchronous transfer mode), signals have to be buffered whenever two packets, called "cells" in ATM, are present simultaneously for transfer in a particular channel. Because of the random traffic volume, the possibility of two packets having to be forwarded simultaneously on the same path cannot be ruled out.

From J.S. Turner, "Design of a Broadcast Packet Network", published in "Proceedings of INFOCOM '86", April 1986, pages 667 to 675, it is known to combine Links of an ATM switching network into link groups. The links of each group run parallel and are completely equivalent. Besides increasing capacity, this compensates for random traffic variations, which reduces the number of buffers required.

DE 37 42 941 C2 (corresponding to U.S. Pat. No. 4,922,487 discloses an ATM exchange in which fixed numbers of cells or packets to be switched are combined into a frame, and all packets are divided into subpackets of equal length and distributed to subframes. Switching takes place on the basis of subframes using synchronous time-division multiplexing. Use is made of the fact that all time slots on a line represent equivalent serving channels, whereby random variations are largely compensated for. The buffers are those which are required for synchronous time-multiplexed switching anyhow. The storage space required in the switching network is reduced in the ratio of frames : subframes.

From D. W. Smith et al, "Multidimensional Optical Switching Networks", IEEE 1989it is known to combine the conventional multiplexing methods, which, in optical switching, also includes wavelength- or frequency-division multiplexing besides time- and space-division multiplexing, for the purpose of increasing the capacity of an optical exchange. The addition of wavelength- or frequency-division multiplex as a further dimension increases not only the capacity of the exchange but also, to the same extent, the number of equivalent serving channels. However, the total capacity of this exchange is quite limited.

With a sufficient number of equivalent serving channels, random variations are compensated for to the point that buffers can be dispensed with except those required for time-slot interchanging during time-division multiplexing. Even in those cases where buffers are used, there are Limits to the compensation of random variations.

DISCLOSURE OF INVENTION

It is object of the invention to provide an optical switch wherein all multiplex modes (space, time, wavelength) are combinable and whose total capacity can be increased practically at will.

This object is attained by providing an optical switch according to the teaching of inserting time-slot-interchanging or wavelength-converting devices between every two space division networks. The space switching stage and time-slot-interchanging or wavelength-converting devices may form a functional unit.

In further accord with the present invention, the optical switch has a plurality of switching modules of identical construction, each having time-slot-interchanging and wavelength-converting devices and at least one space switching stage wherein the switching modules are arranged in at least two successive stages.

In still further accord with the present invention, each switching module may include two space switching stages, wherein one of the space switching stages is inserted between the time-slot-interchanging devices and the wavelength-converting devices, and that between the two space switching stages, either the time-slot-interchanging devices or the wavelength converting devices are inserted.

In still further accord with the present invention, time-slot-interchanging devices may be alternated with wavelength-converting devices with a space switching stage in between.

The invention is predicated on recognition that in multistage switching networks, which are indispensable for Larger systems, the order of succession of the different (space, time, wavelength) converting devices is of great importance. Any direct succession of space stages is of no use (unless they are functionally united with time-slot-interchanging or wavelength-converting devices) and should therefore be avoided. Any direct succession of time-slot-interchanging and wavelength-converting devices should also be avoided. Modular construction using identical modules is desirable.

The invention will become more apparent from the following description of an embodiment taken in conjunction with the accompanying drawing.

BEST MODE FOR CARRYING OUT THE INVENTION

Figure 1:
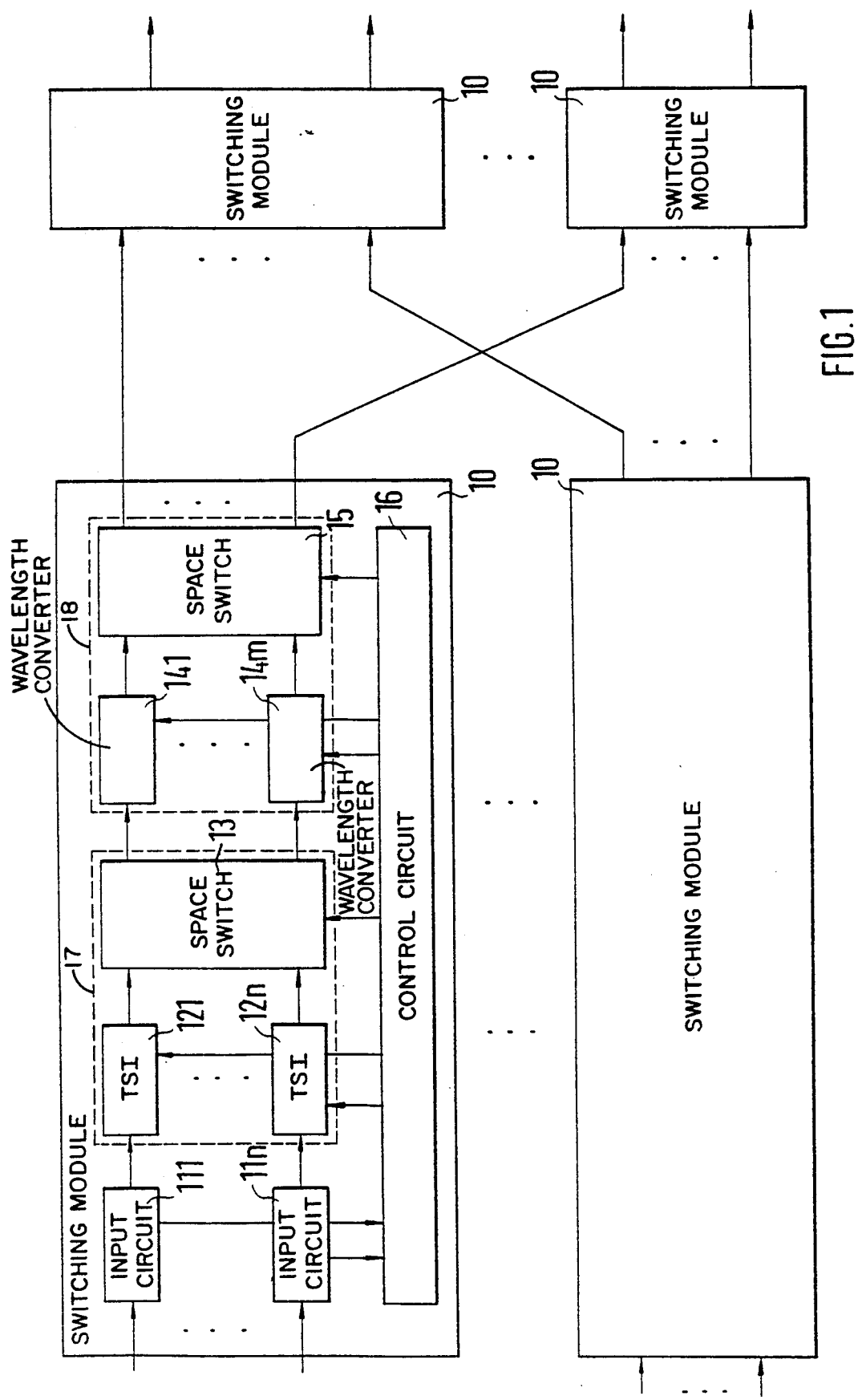
FIG. 1 shows an optical switch according to the invention, comprising a plurality of switching modules, one of which is shown detail.

The optical switch shown in FIG. 1 has a plurality of switching modules 10 which are arranged in two successive stages. In each stage, two switching modules 10 are shown; further modules are indicated by dots. The switching modules 10 are interconnected in the same manner as is known from electric switches. In principle, any of the structures known from there, including multistage structures, can be used here. The same applies to the insertion of these switches between peripheral devices, for clock supply, power supply, and control.

In the case of one of the switching modules 10, the internal construction is shown. Each optical input Line terminates at an input circuit 111, ..., 11n. These input circuits synchronize the incoming data and extract control information which is contained in the data stream and intended for this switching module.

Since several signals of different wavelengths occur simultaneously on each input Line, all these signals must be synchronized as well. It can be assumed that all signals incoming on the same input line were synchronous when Leaving the unit preceding this switching module. If the dispersion of the lines, i.e., the dependence of propagation velocity on wavelength, is Low, it suffices to synchronize all signals of an input Line jointly provided that the type of synchronizing means used permits this. Aside from the means for determining the correct clock rate, mainly short-time storages are necessary here. Suitable as such are bistable devices or switchable delay elements.

If bistable devices are employed, the different signals with different wavelengths must, in any case, be separated and individually synchronized. Since in the subsequent devices each signal, e.g., each ATM cell, has to be switched independently of all others, this separation must take place anyhow.

If optical-to-electric and electric-to-optical transducers are employed, conventional electric bistable devices can be used.

Bistable optical devices are known from H.S. Hinton, "Architectural Considerations for Photonic Switching Networks", IEEE Journal on Selected Areas in Communications, Vol. 6, No. 7, August 1988, pages 1209 to 1225.

Switchable optical delay elements for optical timeslot selectors are disclosed in DE-OS 35 11 072. They can also be used for synchronization purposes if other delays are chosen.

The control information can be extracted optically or electrically. It can be in the form of control cells intended for the respective switching module and in the form of address information contained in the cells. It is also possible to reserve one wavelength for control information, which then consists both of all address information for the cells arriving on the other wavelengths and of other control information intended for the switching module.

Each of the input circuits 111, ..., 11n is followed by a time stage (time-slot interchanger) 121, ..., 12n. Especially in ATM systems, where the time slot must be changed for each complete cell of uniform Length, the time stage will advantageously be implemented with delay elements as disclosed in the above-mentioned DE-OS 35 11 072. It is particularly advantageous, though not imperative, if the existing delay elements can be selectively assigned to each individual wavelength. This results in the ATM-typical random variations being slightly compensated for within a time stage, so that fewer delay elements serving as storage elements are needed. Otherwise, a given number of delay elements would have to be provided for each wavelength.

The time stages 121, ..., 12n are followed by a space stage 13. The space stage has one input per preceding time stage and per wavelength used, and just as many outputs. Every input must be connectable to every output without blocking the connection between any other input and any other output. The space stage, despite the designation used here, need not necessarily be a single stage. Multistage space switching networks are also permissible (and, in fact, necessary during a transition period). Such space switching networks are generally known; the structures are the same as in electric space switching networks, and the individual crosspoint elements (e.g., optical stripline crossings) have also been in the prior art for a Long time. Larger single-stage networks are also known, e.g., from the above-mentioned article by H.S. Hinton.

The space stage 13 is followed by wavelength converters 141, ..., 14m. The number of wavelength converters required is equal to the number of input Lines multiplied by the number of wavelengths used. In the simplest case, wavelength converters can be formed by a succession of photodiode and Laser diode. Use can be made both of a tunable Laser diode and of a corresponding number of Laser diodes with different wavelengths, in which case either tuning or switchover is necessary. Also known are purely optically operating wavelength converters, e.g., from H. Kawaguchi et al., "tunable optical-Wavelength Conversion Using an optically Triggerable Multielectrode Distributed Feedback Laser Diode", IEEE Journal of Quantum Electronics, Vol. 24, No. 11, November 1988, pages 2153 to 2159.

The wavelength converters 141, ..., 14m are followed by a space stage 15, which may resemble the space stage 13.

The switching module 10 further includes a control circuit 16. Besides performing various checking functions, which are not considered here, this control circuit is designed to initiate the conversions in time, space, and wavelength required in the stages following the input circuits for each cell arriving in the input circuits. To this end, the control information is extracted in the individual input circuits 111, ..., 11n as described above, and fed to the control circuit 16. The Latter, in turn, provides control information derived therefrom to the time stages 121, ..., 12n, to the wavelength converters 141, ..., 14m, and to the space stages 13 and 15.

The address information contained in the cells can be converted to the necessary control information either directly with the aid of an algorithm (self-routing) or with the aid of information stored in connection tables (label routing), which can then be updated by additional control information which reaches the control circuit 16 over the input Lines or otherwise.

As mentioned, the control signals can be extracted from the input Lines in optical or electric form. However, the control circuit 16 will be implemented as an electric circuit, even though it is to be expected that in the future suitable optical circuits will be available for this purpose, too.

In all converter stages, the signals must be separated into their individual wavelengths. Wavelength-division multiplexers and demultiplexers are generally known. Within the converter stages, wavelength-division multiplex is used as an additional spatial dimension. For various reasons, however, it is quite useful to replace one spatial dimension between the individual stages by wavelength-division multiplexing.

Critical with respect to delays and, hence, to synchronization are not so much the conditions within the converter stages, but rather the conditions between them, particularly the Lines between the switching modules.

If integrated optical circuits are employed, it will be considerably Less difficult than with electric circuits to integrate further circuit elements than to provide additional terminals and interconnecting Lines. Wavelength-division multiplexers and demultiplexers are Less costly than additional interconnecting Lines.

It is advantageous if, as in the example of FIG. 1, the entire optical switch consists of identical switching modules arranged in at Least two successive stages.

Each of these modules must then contain time stages, wavelength converters, and at Least one space stage.

Any direct succession of two space switching stages, in which each input has access to every output, should be avoided. Each interconnecting Line between two such space switching stages should contain either one time stage or one wavelength converter.

Any direct succession of two time stages or of two wavelength converters should also be avoided, of course. A time stage and a wavelength converter should not follow each other, either. Time stages and wavelength converters should always be separated by a space stage.

Such an optical switch preferably consists of switching modules of identical construction which include time stages, wavelength converters, and at Least one space switching stage and are arranged in at Least two successive stages.

Switching modules which each have two space switching stages are especial advantageous. A combination of wavelength and space conversion and a combination of time and space conversion then follow each other, with the order being irrelevant. Within the two combinations, too, it is irrelevant which of the two functions comes first. However, the two space conversions must not follow each other directly. Any direct succession of wavelength and time conversion should also be avoided.

Each of the two space stages and the time stages or wavelength converters may also form a functional unit.

Figure 1B:
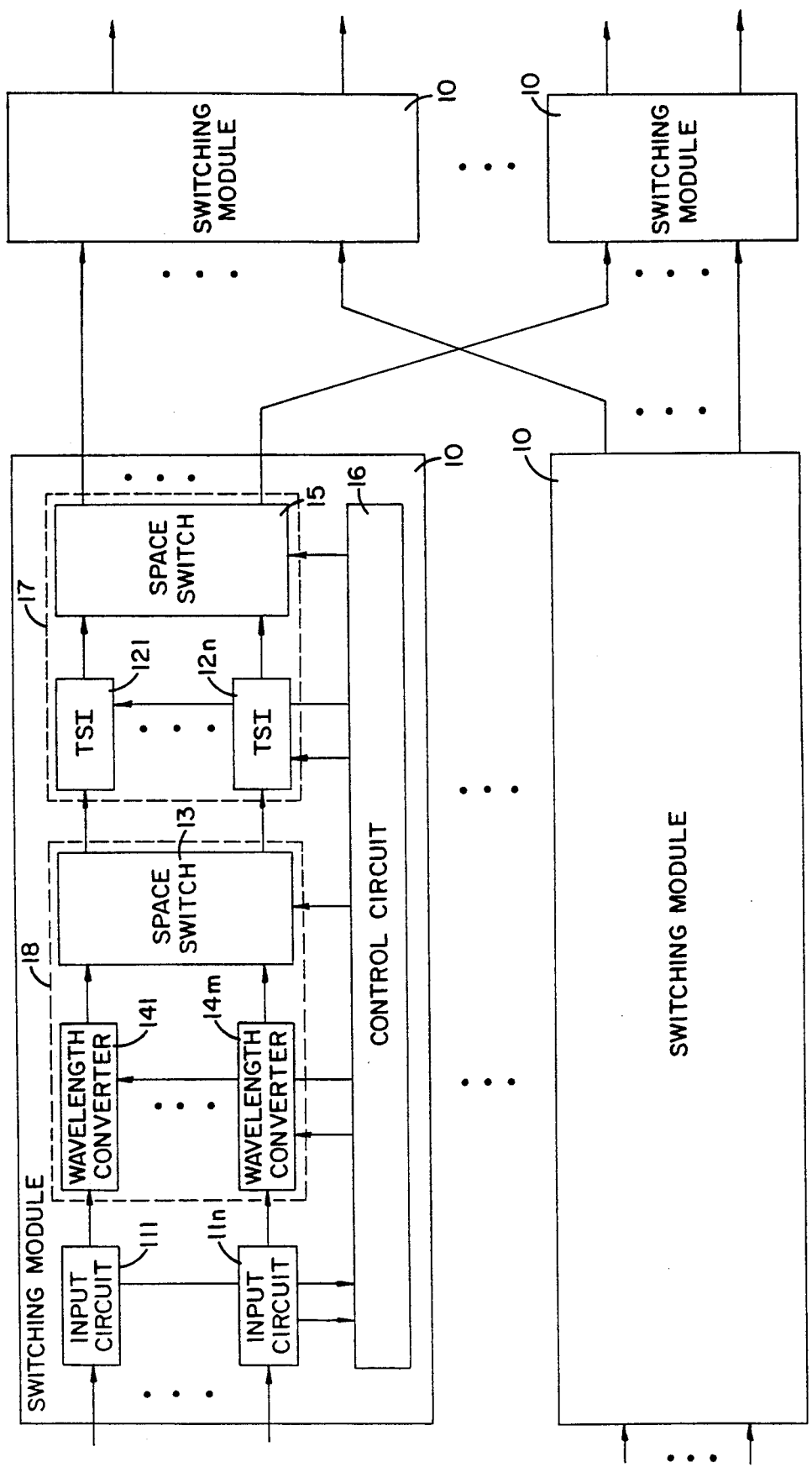
FIGS. 1B, 1C and 1D show an optical switch, according to the invention, comprising a plurality of switching modules in various combinations.
Figure 1C:
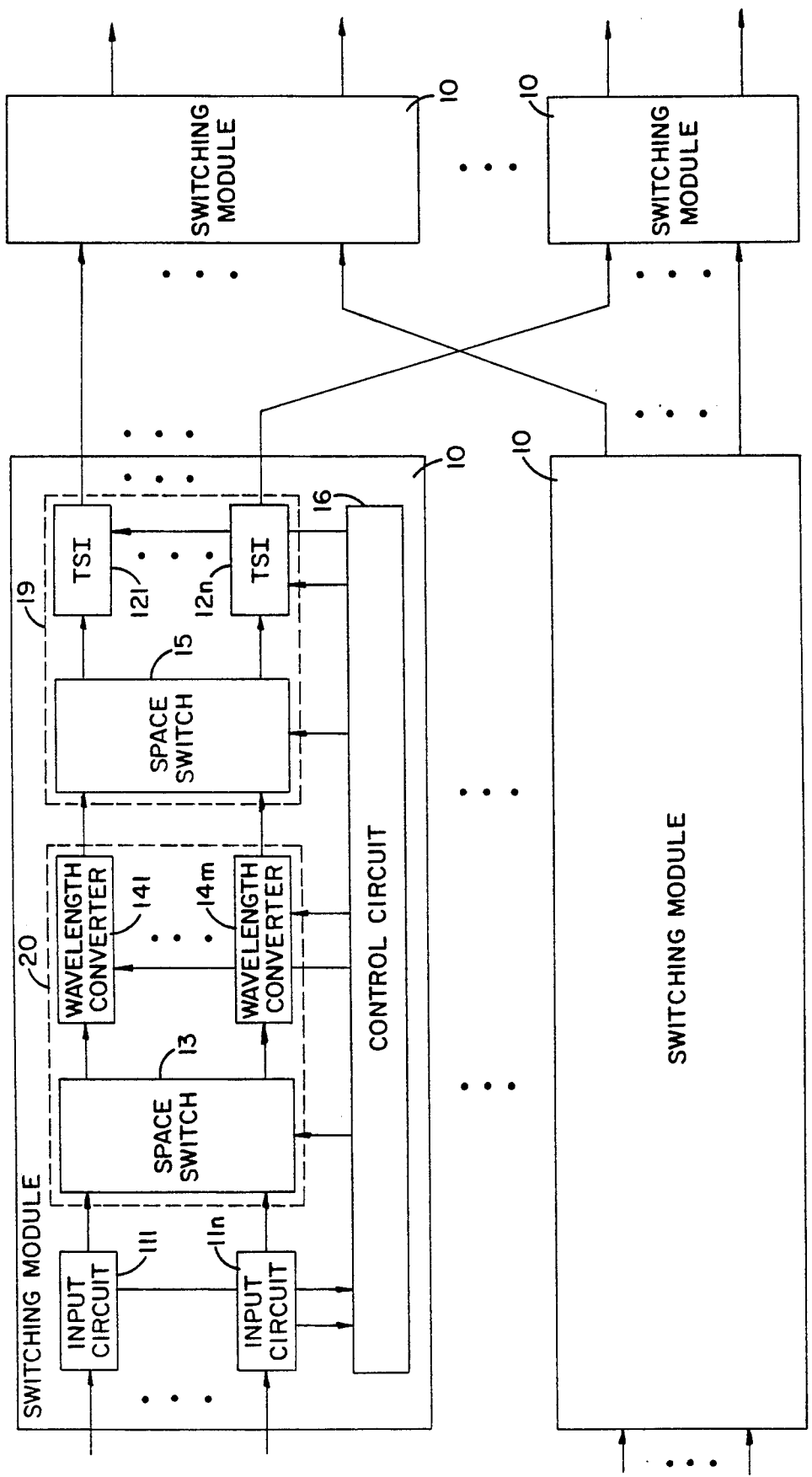
Figure 1D:
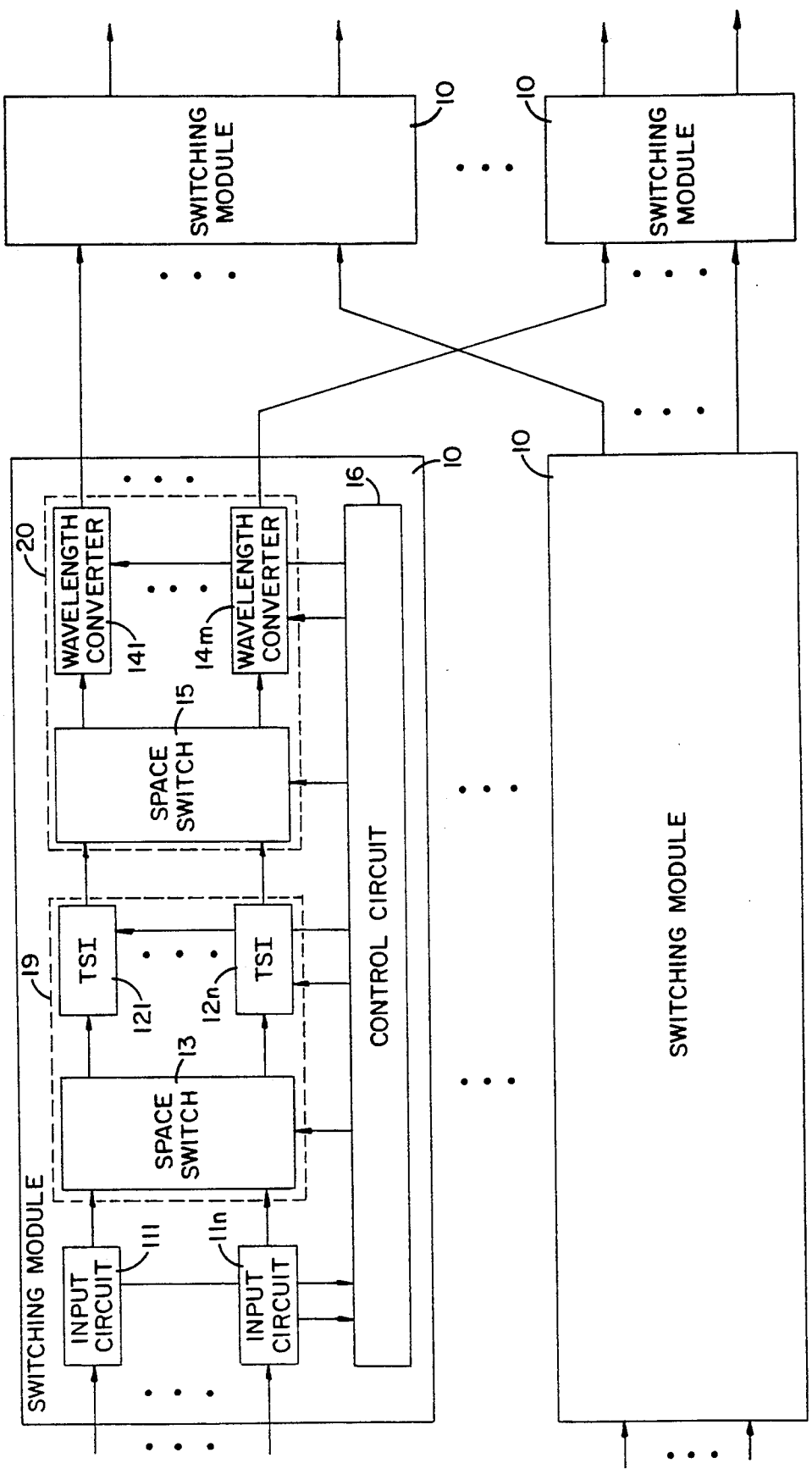

FIG. 1 shows a block 17 in dashed lines enclosing the time slot interchangers and the space switch 13 to indicate such a functional unit. Similarly, a block 18 is shown in dashed lines to indicate the functional combination of the wavelength converters and space switch 15 which may be done, if desired. Similarly, FIG. 1B shows the functional units 17 and 18 switched in order to demonstrate that the order is, in face, irrelevant. Similarly, FIG. 1C shows that within the two combinations, also, it is irrelevant which of the two functions comes first. For example, a block 20 shown in dashed lines having the space switch 13 preceding the wavelength converters, unlike the block 18 of FIGS. 1 and 1B. Similarly, a block 19 in FIG. 1C shows the time slot interchangers downstream of the space switch 15, unlike the block 17 of FIGS. 1 and 1B. As mentioned, the ordering is not relevant. Similarly, FIG. 1D shows yet another variation, with the ordering of blocks 19 and 20 reversed from the situation shown in FIG. 1C. These are but examples, other combinations of course being possible, according to the invention.

If, as mentioned above, the time stages are formed from delay elements which are each common to all lines, it must be ensured by switching elements that each delay element is accessible from every input and has access to every output. The function of the space stage is then included.

Figure 2:
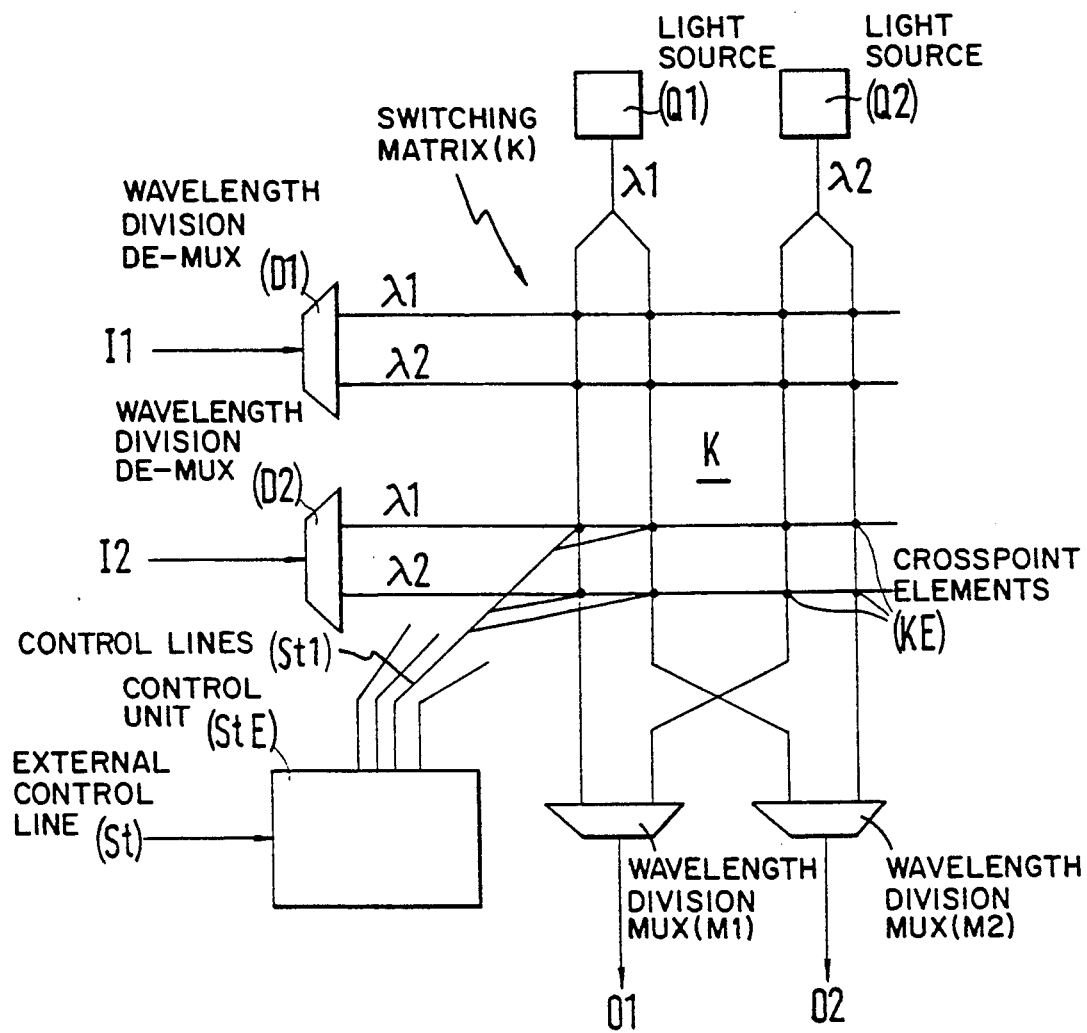
FIG. 2 shows a switch element in which wavelength-converting devices are functionally united with a space switching stage.

FIG. 2 shows a simple example of a switch element in which the wavelength-converting devices 141, . . . , 14m are functionally united with the space switching stage 15.

Extensions to more inputs and outputs and to more wavelengths are readily possible.

The switch element of FIG. 2 has two inputs I1 and I2, two outputs 01 and 02, two wavelength-division demultiplexers D1 and D2, two wavelength-division multiplexers M1 and M2, two steady sources of Light Q1 and Q2, and a switching matrix K with crosspoint elements KE (e.g., modulators).

The switch element further includes a control unit StE with control Lines Stl for controlling the crosspoint elements KE as well as an external control Line St for receiving the necessary control signals. This control unit forms part of the control circuit 16.

At each input and output, two signals can be transmitted using wavelength-division multiplexing. Two operating wavelengths Lambda 1 and Lambda 2 are provided. In each of the demultiplexers D1 and D2 following the inputs I1 and I2, separation according to the two wavelengths takes place. The four separate signals are applied to the optical row Lines of the switching matrix K.

The two steady sources of Light Q and Q2 operate at the two wavelengths Lambda 1 and Lambda 2, respectively. Each of the steady sources feeds two column lines of the switching matrix K.

The row and column Lines intersect at the crosspoint elements KE. Each crosspoint element KE is designed to pass the Light from the associated steady source unaltered in a nonactivated state and to modulate this Light with the signal of the associated row Line in an activated state. Switching between the activated and nonactivated states is effected by the above-mentioned means for controlling the crosspoint elements.

From each steady source of Light Q1 and Q2, a column Line runs to each wavelength-division multiplexer M1 and M2. The wavelength-division multiplexers M1 and M2 are connected ahead of the outputs 01 and 02, respectively, and each combine the signals intended for the respective output, which are modulated onto Light of different operating wavelengths, into a wavelength-division-multiplexed signal.

Thus, a signal path which is switchable or not switchable for each signal component coming from the input by activation or nonactivation of a crosspoint element KE leadsfrom each input I1 and I2 to each output 01 and 02. By proper selection of the crosspoint elements, the signal path can be switched with wavelength conversion (Lambda 1/Lambda 2, Lambda 2/Lambda 1) or without wavelength conversion (Lamdba 1/Lambda 1, Lambda 2/Lambda 2). Each signal component arriving at one of the inputs can thus be switched to each of the outputs with or without wavelength conversion, care normally having to be taken to ensure that for each operating wavelength, no more than one signal component is switched to each output, i.e., that per column Line, no more than one crosspoint element is activated at a time. For the realization of the individual functions, the person skilled in the art has sufficient possibilities. By way of example, reference is made to an article by M. Sakaguchi and K. Kaede, "Optical Switching Device Technologies", IEEE Communications Magazine, May 1987, Vol. 25, No. 5, pages 27 to 32.

Simple demultiplexers can be implemented with fitters, and simple multiplexers with couplers. Preferred crosspoint elements are optically controllable and electrically activatable elements. At present, however, the electric controllability of optical switches is still simpler to implement; to this end, the input signal components would have to be converted to electric signals.

Although the invention has been shown and described with respect to a best mode embodiment thereof, it should be understood that various changes, modifications and other approaches may be made or pursued according to the teachings hereof, resulting in various other embodiments which nonetheless remain with the spirit and scope of the claimed invention.

We claim:

1. Apparatus, responsive to optical input signals on a plurality of optical input signal lines, for providing a plurality of optical output signals on optical output signal lines, comprising devices for interchanging the time slots or converting the wavelengths of one or more of the input signals, and further comprising a space-division switching network for freely exchanging signals on different signal lines, wherein the apparatus is a multistage switch having both a stage comprising a device for interchanging the time slots and a stage comprising a device for converting the wavelengths of one or more of the input signals and having at least two space-division switching network stages, and wherein between every two of the space-division switching network stages, a time-slot-interchanging or wavelength-converting stage is inserted.

2. Apparatus as claimed in claim 1, wherein the time-slot-interchanging stags alternate with wavelength-converting stages, and that a space-division switching network stage is provided therebetween.

3. Apparatus as claimed in claim 1, wherein a space-division switching network stage and time-slot-interchanging or wavelength-converting stage form a functional unit.

4. Apparatus as claimed in claim 1, wherein the apparatus comprises a module for use in a system having a plurality of such modules of identical construction.

5. A switching module for an optical switch, comprising: a stage comprising a plurality of time-slot-interchanging devices (121, ..., 12n), a stage comprising a plurality of wavelength-converting devices (141, ..., 14m), and two space switching stages (13, 15), wherein one of the space switching stages (13) is inserted between the stage comprising a plurality of time-slot-interchanging devices (121, ..., 12n) and the stage comprising a plurality of wavelength-converting devices (141, ..., 14m), and that between the two space switching stages (13, 15), either the stage comprising a plurality of time-slot-interchanging devices or the stage comprising a plurality of wavelength converting devices (141, ..., 14m) is inserted.

6. Apparatus, comprising:
a first unit having a first space-division switch and a first time-slot-interchanging converter or a first wavelength-division converter, responsive to a plurality of input signals, for providing a first space-switched plurality of converted signals; and
a second unit having a second space-division switch and a second time-slot-interchanging converter or a second wavelength-division converter, responsive to the first space-switched plurality of signals, for providing a second space-switched plurality of converted signals.

7. The apparatus of claim 6, wherein the first unit is a time-slot-interchanging converter in combination with the first space-division switch and the second unit is a wavelength converter in combination with the second space-division switch.

8. The apparatus of claim 7, wherein the time-slot-interchanging converter is responsive to the plurality of input signals, the first space-division switch is for providing the first space-switched plurality of converted signals to which the wavelength converter of the second unit is responsive, and wherein the second space-division switch is for providing the second space-switched plurality of converted signals.

9. The apparatus of claim 7; wherein the first space-division switch is responsive to the plurality of input signals, the time-slot-interchanging converter of the first unit is for providing the first space-switched plurality of converted signals to which the second space-division switch is responsive, and wherein the wavelength converter of the second is for providing the second space-switched plurality of converted signals.

10. The apparatus of claim 6, wherein the first unit is a wavelength converter in combination with the first space-division switch and the second unit is a time slot interchanging unit in combination with the second space-division switch.

11. The apparatus of claim 10, wherein the wavelength converter is responsive to the plurality of input signals, the first space-division switch is for providing the first space-switched plurality of converted signals to which the time slot interchanging converter of the second unit is responsive, and wherein the second space-division switch is for providing the second space-switched plurality of converted signals.

12. The apparatus of claim 10, wherein the first space-division switch is responsive to the plurality of input signals, the wavelength converter is for providing the first space-switched plurality of converted signals to which the second space-division switch of the second unit is responsive, and wherein the time slot interchanging converter is for providing the second space-switched plurality of converted signals.

* * * * *

UNITED STATES PATENT AND TRADEMARK OFFICE
CERTIFICATE OF CORRECTION

PATENT NO. : 5,303,077
DATED     : April 12, 1994
INVENTOR(S) : D. Bottle et al

It is certified that error appears in the above-identified patent and that said Letters Patent is hereby corrected as shown below:

At column 7, line 21, please change "stags" to --stages--.

At column 8, line 22, please change ";" to --,--; and at line 28, after "converter of the second", please insert --unit--.

Signed and Sealed this

Twenty-third Day of August, 1994

Attest:

BRUCE LEHMAN

Attesting Officer     Commissioner of Patents and Trademarks